United States Patent
Döhring

(10) Patent No.: US 7,524,550 B2
(45) Date of Patent: Apr. 28, 2009

(54) CARBON-CONTAINING PAPER AND PANEL

(75) Inventor: Dieter Döhring, Lampertswalde (DE)

(73) Assignee: Kronospan Technical Co. Ltd., Nicosia (CY)

( * ) Notice: Subject to any disclaimer, the term of this patent is extended or adjusted under 35 U.S.C. 154(b) by 0 days.

(21) Appl. No.: 10/598,146

(22) PCT Filed: Nov. 19, 2004

(86) PCT No.: PCT/EP2004/053015

§ 371 (c)(1),
(2), (4) Date: Aug. 18, 2006

(87) PCT Pub. No.: WO2005/090097

PCT Pub. Date: Sep. 29, 2005

(65) Prior Publication Data

US 2007/0141327 A1    Jun. 21, 2007

(30) Foreign Application Priority Data

Feb. 20, 2004   (DE) .................. 20 2004 002 832 U

(51) Int. Cl.
*B32B 5/66* (2006.01)

(52) U.S. Cl. .................. 428/195; 428/211; 428/524; 428/530; 428/535; 428/536; 428/537.5

(58) Field of Classification Search .................. 428/524, 428/530, 535, 536, 537.5, 195, 211
See application file for complete search history.

(56) References Cited

U.S. PATENT DOCUMENTS

| 4,430,375 A | | 2/1984 | Scher et al. |
| 4,472,474 A | * | 9/1984 | Grosheim et al. ......... 428/195.1 |
| 4,784,908 A | | 11/1988 | Ungar et al. |
| 4,940,503 A | * | 7/1990 | Lindgren et al. ............ 156/279 |
| 5,677,039 A | * | 10/1997 | Perrin et al. ................ 428/205 |

FOREIGN PATENT DOCUMENTS

| DE | 71 02 181 | 4/1971 |
| DE | 33 23 461 | 8/1984 |
| DE | 34 46 632 | 7/1985 |
| DE | 35 11 046 | 10/1985 |
| JP | 04240300 | 8/1992 |
| WO | 02/079571 | 10/2002 |

* cited by examiner

*Primary Examiner*—Leszek Kiliman
(74) *Attorney, Agent, or Firm*—Renner, Otto, Boisselle & Sklar LLP

(57) ABSTRACT

The invention relates to a paper and panels made therefrom for flooring.

13 Claims, 1 Drawing Sheet

CARBON-CONTAINING PAPER AND PANEL

Figure 1:
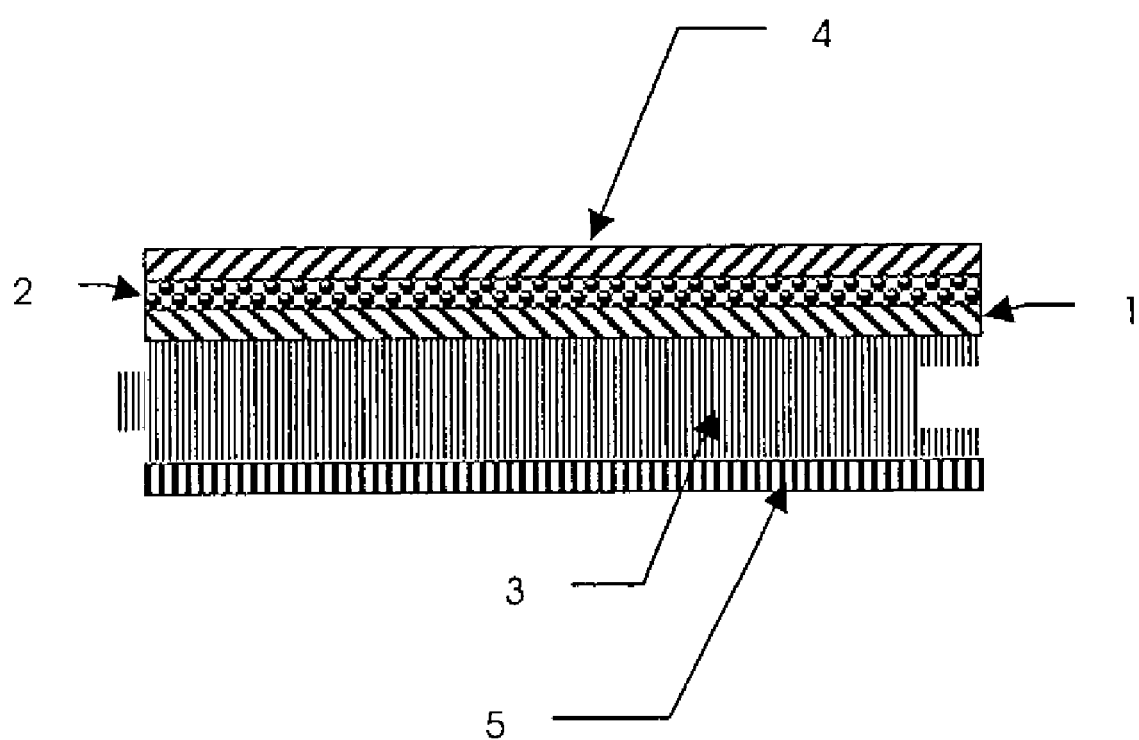

This application is a national phase of International Application No. PCT/EP2004/053015 filed Nov. 19, 2004 and published in the English language.

The invention relates to paper as well as to panels made therefrom for flooring. The panels comprise a carrier and a paper attached thereon, which is usually printed and in this case denoted as décor paper. Commonly, a counter-acting element, preferably in the form of a paper, is attached underneath the carrier. The panels are provided with coupling elements on their sides. Thus, panels can be fitted together with or without glue, as it is for example described in WO 01/94721 A1.

The décor paper may be provided with abrasion resistant particles made from co-rundum, aluminum oxide or silicon carbide, so that a person may walk on the décor paper. The abrasion resistant particles are embedded in a resin matrix. For cost reasons, usually melamine resins are preferred, which might be mixed with urea resins. Methods for the manufacturing of décor papers for flooring panels are known from documents U.S. Pat. No. 4,940,503; WO 00/44576 A1; WO 00/44984 A1 and WO 02/066265.

The counter-acting paper may be attached to the carrier by means of a resin. In this case, urea resin is preferred since the resistance against moisture is not particularly critical on the underside. Therefore, expensive additives like e.g. melamine resin may be omitted.

In many cases, the carrier is made from a board of a wooden composite. Currently, HDF is preferred as material for the carrier, since this material has comparably good dimensional stability for a wooden composite and can easily be machined. A production method for such a board is described in DE 202 10 718 U1.

The carrier for a laminate flooring may also consist of a plurality of paper layers, which are glued together, as is e. g. disclosed in WO 96/27721.

Such a laminate flooring may be subjected to electrical charging by means of frictional electricity when walked upon, in particular in connection with relatively low air humidity. In the sense of this invention, air humidity of less than 50% is considered as low. Under unfavorable conditions, a human may charge himself with a body voltage of up to 25,000 V.

When approaching grounded parts, as e.g. a radiator, discharge sparks can appear, which are noticeable by persons sensitive for such effects if above 2 kV. With higher charges, such a discharge can be painful. Further, such charges can damage electronic devices as e.g. computers and electronic circuits.

To solve this problem, panels with so-called "antistatic" behavior are offered. According to EN 1815, a panel can only claim that title if the potential charging of persons is below 2,000 V.

It is the problem of the invention to provide a décor paper together with a panel with antistatic properties. This problem is solved with a paper according to the features of the main claim. Preferred embodiments derive from the dependent claims.

According to the invention, a paper and preferably a so-called décor paper is provided with a conductive material and in particular carbon. Preferably, this is achieved by adding carbon to a dispersion, which contains a resin and in particular an amino resin and/or an acrylate resin. The acrylate resin is used preferably if the strength of the paper shall be improved. The strength ought to be improved in particular if very thin papers are used, to reduce costs. A thin paper in the sense of the invention is a paper with a mass-per-unit area of not more than 50 g/m$^2$. The paper according to the invention may only have 10 g/m$^2$ in untreated condition. If it is provided with an acrylate resin, then this may sufficiently improve the strength and in particular if the dispersion containing the acrylate resin is pressed into the paper. The dispersion can be pressed into the paper in the sense of the invention if the dispersion is applied onto the paper by means of two rollers, whereby the rollers are pressed against each other and the paper runs between the rollers. This is in contrast to cases in which the acrylate resin is merely painted onto the paper, as it is e.g. described in WO 02/079571.

To minimize disturbances, at least the surfaces of those rollers intended to press the dispersion into the paper are provided with a rubber coating.

A content of carbon in relation to the paper weight used of merely 1-5 wt.-% is already enough to observe a significant improvement in conductivity. If, for example, in a preferred example the paper weight is 30 g/m$^2$, then 0.5 g of carbon per square meter of paper is enough to clearly improve the conductivity of the paper. In the above-given example, the carbon content should not exceed 20 g. In other words, the threshold of 60-70 wt.-% should not be exceeded. An amount of 25-35 wt.-% turned out to be advantageous, in other words of 8-10 g per m$^2$ of paper in the above mentioned example, to achieve on the one side the desired antistatic properties of the panel and on the other side to produce a décor paper with acceptable costs.

The paper may be passed through a mixture (that means the dispersion) in the form of a paper web, which mixture contains next to urea resin and/or melamine resins the above-mentioned conductive materials and in particular carbon. The thus-soaked paper is dried and pressed together with a carrier, preferably under application of heat.

The mixture, respectively the dispersion, may alternatively e.g. be sprayed onto the paper.

The result is a panel with improved antistatic properties compared to a panel which is provided with a paper which was saturated with ordinary resins. Due to the conductive particles, the electric conductivity in the surface area of the flooring is improved. This results in a reduced charging of persons walking on said flooring.

Abrasion resistant particles may be provided on the upper surface of the décor according to the state of the art, as was discussed above. For an economic production, the mixture already contains abrasion resistant particles and in particular aluminum oxide respective corundum, since these materials are normally almost invisible such that the look of the décor remains almost unimpaired. Thus, in one step, abrasion resistant particles are applied onto the décor paper and at the same time the antistatic properties are improved.

Preferably, first a conductive paper is manufactured and this is provided afterwards with a décor, in particular by means of printing. Through this, the décor is optically not impaired by the conductive materials as e.g. the carbon.

Afterwards, a layer with abrasion resistant particles is supplied onto the upper side of the décor, as is e.g. disclosed in documents EP 1 068 083 A1 or WO 00/44984. The methods known from these documents are included herein by reference.

Finally, according to the desired embodiment, an overlay may be provided which is saturated with a mixture that contains a resin, like e.g. urea resin and/or melamine resin. Further, this mixture may also contain substances which improve the electrical conductivity. Carrier, décor paper and, if desired, overlay are then pressed together into a panel. Commonly, also a counter-acting paper is pressed, which is then located on the underside of the carrier.

Alternatively, abrasion resistant particles, like e.g. corundum, may be applied onto one side of the overlay. Carrier, décor paper and overlay as well as, if desired, a counter-acting paper are pressed together such that the abrasion resistant particles are situated between the décor paper and the overlay. The décor is visible on the surface of the board.

If the carbon is added to the dispersion in the form of very small particles with diameters in the range of nanometers, a very good distribution of the carbon in the paper is achieved. According to the invention, the potential charging of the flooring with an air humidity of 25% is reduced down to 0.8 kV. A common flooring may charge under comparable conditions up to 5-6 kV. Thus, according to the invention norm EN 1815 can be met without problems.

Further, it has been found out that the application of conductive particles in the dispersion, which is pressed into the paper, regularly improves the electrical conductivity only comparably marginally. Probably, this is due to an encapsulation of the electrical conductive particles by the resin, which are thus electrically insulated. Surprisingly, such an effect was not observed with carbon.

Alternatively, paper can already be provided with conductive substances as e.g. carbon during the production of the paper, to improve the conductivity according to the invention. Thus, according to the invention, a paper is used having an electric conductivity several times exceeding the conductivity of the counter-acting paper, since the electric conductivity is of no interest with the counter-acting paper. Usually, the electric conductivity of the décor paper also exceeds the electric conductivity of a maybe-applied overlay paper by several times, since usually conductive particles are to be avoided in the overlay to prevent a deterioration of the optic of the panels.

The acrylate-containing dispersion or mixture contains in particular water, in which the acrylate as well as the conductive particles are dispersed. Suitable acrylates as well as conductive particles are thus those which may easily be dispersed.

In an advantageous embodiment of the invention, the acrylate-containing dispersion or mixture is pressed into the paper together with the conductive particles. For this purpose, the paper is pressed in particular between rollers, which are pressed against each other. The rollers are provided with a rubber coating, to prevent damage to the papers. The acrylate-containing dispersion or mixture is continually applied to one roller. After the paper leaves the rollers, the dispersion or mixture with the conductive particles is pressed into the paper.

A large advantage is that the dispersed acrylate is not merely painted onto the paper, since in that case the dispersed acrylate would not or only insufficiently penetrate into the paper. By pressing, it is secured that the dispersion or mixture penetrates the paper, such that the paper achieves the desired improved strength. Additionally, the paper is impregnated with the dispersion or mixture such that, during the subsequent processing to a panel, additionally applied resin does not, or at least only to a very small amount penetrate the paper.

In a preferred embodiment of the method, the paper is ventilated or de-aerated before the acrylate-containing dispersion or mixture of the impregnation is pressed into the same. For this purpose, the paper is impregnated on one side with the acrylate-containing dispersion or mixture, which may already contain the conductive particles. The air contained in the paper is thus replaced by the dispersion or mixture.

In one embodiment of the invention, a resin/acrylate mixture or dispersion, in particular an amino resin/acrylate mixture, which contains the conductive particles, and in particular carbon, is used for the impregnation. With such a mixture or dispersion, paper weights may be realized down to a lower limit of approximately 10 $g/m^2$. Papers produced in such a way are, together with suitable mixtures, sufficiently tear-prove to use them as e.g. counter-acting paper in the manufacturing of panels. It may be left to the skilled person to find suitable mixtures with the help of few experiments.

The paper should not exceed an upper limit of 50 $g/m^2$, preferably of 35 $g/m^2$, to achieve sufficient cost advantages. Currently, optimal values range between 25-35 $g/m^2$.

In a preferred embodiment of the invention, coloring pigments are added to the dispersion, such as aluminum silicate, calcium carbonate, $TiO_2$, $AlO_2$ or manganese silicate. In this way, the light transmissivity is considerably reduced. In this way, the paper can be provided subsequently with the décor, without having an undesirably half-transparent appearance.

In a preferred embodiment of the invention, the dispersion or mixture, which contains the acrylate resin as well as the carbon, is pressed from both sides into de-aerated paper. It has been shown that in this way the paper, starting from the middle of the same, fills with the acrylate-resin containing dispersion or mixture containing the conductive particles. Such an impregnated paper is particularly well suited for the above-mentioned production of panels.

Paper produced with this method differs from the so-called finished foils, which only have the acrylate painted onto but not pressed into, in particular in that the acrylate is located in the paper and not merely completely or predominantly on the surface. The ply-bond strength is significantly higher than with the mentioned finished foils, as can be shown in a water-steam test; in a water-steam test, paper is exposed for two hours to water vapor. With ordinary paper, and in contrast to an inventive paper, fission appears.

The acrylate-resin containing paper may also be used as a counter-acting paper during the manufacturing of a panel in the above-mentioned manner, in order to allow the usage of a particularly thin paper, which reduces the manufacturing costs. This paper serving as counter-acting paper does not necessarily have to be provided with conductive particles, nor with coloring pigments. A good electrical conductivity of the counter-acting paper would not add to the desired antistatic properties.

Carbon is merely the preferred example. Also quaternary amines may e.g. be used, to improve the electrical conductivity. Additionally, the paper may already also during its manufacturing be provided with electrical conductive materials.

EXAMPLE

The above-described dispersion is pressed into a paper 1 with 30 $g/m^2$, the carbon particles having an average diameter of less than 1,000 nm, preferably less than 500 nm. 8-10 g carbon are applied per square meter paper. The dispersion comprises an urea and/or a melamine resin, as well as acrylate. After drying of the paper, the same is printed and in this way provided with a décor.

The such-produced conductive décor paper 1 is impregnated with a melamine resin, provided with abrasion resistant particles and is dried. With its underside, the décor paper is arranged onto an 8-mm thick HDF board 3. Onto the décor, a so-called overlay 4 is applied, which is saturated with a mixture of melamine resin. Alternatively, fibers and melamine resin are applied to save the expenses for the separate production of the overlay. Underneath the HDF board, a paper 5 is arranged, serving as counter-acting paper, which is saturated with an urea resin. Papers 1 and 5 including overlay 4, respectively the resin with the fibers, and the HDF board 3 are pressed by temperatures of 180° C.-220° C., for example with a fast-cycle press.

Panels provided with coupling means having dimensions of 1,400 mm×200 mm are produced by cutting and milling board 3 together with the pressed papers. The result is shown schematically in the figure.

For test reasons, flooring was formed from several panels, which were all produced according to the above-given example. At room temperature and with an air humidity of 25%, the charging rate of test persons was only 0.5 kV. A comparison to conventional panels showed charging of up to 6 kV.

The invention claimed is:

1. Décor paper for laminate flooring, having a décor and comprising conductive carbon having an average particle size of less than 1000 nm, wherein the décor paper has a paper weight between 10 g/m² and 50 g/m² and is impregnated with a resin/acrylate mixture.

2. Décor paper according to claim 1, wherein the resin is a urea resin and/or a melamine resin.

3. Décor paper according to claim 1, further comprising abrasion-resistant particles.

4. Décor paper according to claim 1, wherein the carbon has an average particle size of less than 500 nm.

5. A panel for flooring, comprising a carrier board and a décor paper according to claim 1 supported by the carrier board and forming a decorative top surface of the panel.

6. A panel according to claim 1, further comprising abrasion-resistant particles applied on the décor paper, and wherein the décor paper has a electrical conductivity higher than any other papers used in the manufacture of the panel.

7. A panel according to claim 1, comprising a counter-acting paper on the underside of the carrier board.

8. A panel according to claim 1, wherein the carrier board is made from HDF.

9. A panel according to claim 1, comprising coupling elements on its sides.

10. Décor paper according to claim 1, wherein the carbon has an average particle size of less than 1 nm.

11. A panel according to claim 5, wherein the carbon has an average particle size of less than 500 nm.

12. A panel according to claim 6, wherein the abrasion-resistant particles comprise corundum particles.

13. A panel according to claim 5, wherein the carrier board is made from HDF.

* * * * *